United States Patent [19]

Huffman et al.

[11] Patent Number: 5,168,199
[45] Date of Patent: Dec. 1, 1992

[54] HORIZONTAL LINEARITY CORRECTION CIRCUITRY FOR CATHODE RAY TUBE DISPLAY

[75] Inventors: David C. Huffman, Norcross; Joseph W. Goode, III, Lawrenceville, both of Ga.

[73] Assignee: Loral Corporation, Yonkers, N.Y.

[21] Appl. No.: 744,918

[22] Filed: Aug. 14, 1991

[51] Int. Cl.[5] .......................... G09G 1/04; H01J 29/74
[52] U.S. Cl. ..................................... 315/370; 315/369
[58] Field of Search ............... 315/370, 371, 367, 369, 315/10

[56] References Cited

U.S. PATENT DOCUMENTS

| | | | |
|---|---|---|---|
| 4,305,022 | 12/1981 | Mitamura | 315/370 |
| 4,352,047 | 9/1982 | Imayaso et al. | 315/370 |
| 4,636,843 | 1/1987 | Hosono et al. | 315/369 |

Primary Examiner—Gregory C. Issing
Attorney, Agent, or Firm—Charles E. Temko

[57] ABSTRACT

An improved system for continuously detecting and correcting the display in a cathode ray tube for errors in size and linearity. The system employs a crystal oscillator as a reference frequency to determine absolute error which is represented as "size" on the display screen, and relative error which is represented as linearity. The error is determined from the index pulse feedback, which is an output of a phase lock loop voltage controlled oscillator which is compared to the reference frequency to provide an error voltage level. This output level is then digitized and processed in terms of general control, interpolation, extrapolation, filtering, etc., testing, and stored in digital memory. The digital error data is converted back to analog levels for insertion into a horizontal auxiliary amplifier circuit for linearity correction. A main horizontal amplifier circuit receives size correction. Size correction is taken from the linearity data as a single data point per raster line which forms a lower frequency correction for each raster line. Linearity error includes approximately 256 points per raster line which provides for generation of complex correction wave forms.

2 Claims, 1 Drawing Sheet

HORIZONTAL LINEARITY CORRECTION CIRCUITRY FOR CATHODE RAY TUBE DISPLAY

BACKGROUND OF THE INVENTION

This invention relates generally to the field of cathode ray tube displays, and more particularly to an improved circuitry system for providing continuous automatic horizontal linearity correction wherein the displayed image is sized to lie within the display area of a cathode ray tube display screen.

In conventional television displays, the correction is normally provided by a manual adjustment on the part of a viewer, as are such variables as contrast, brightness, color balance and the like. However, where the cathode ray tube is part of an informational display viewed by a continuously changing audience, or in which the display is located a substantial distance from the viewer, the use of manual adjustment means is not a viable option.

SUMMARY OF THE INVENTION

Briefly stated, the invention contemplates the provision of an improved system providing horizontal linearity on a continuous automatic basis. Since many information display devices operate on a vertically moving "rolling window" basis, the correction of the display in terms of horizontal size is normally the only monitoring function required.

The system operates by detecting horizontal linearity error and employing the error signal to correct the system in closed loop fashion. A crystal oscillator is used to provide a reference frequency which determines the absolute error which is represented as "size" on the screen, and the relative error which is represented as linearity. Stated differently, the changes in frequency in the index pulse feedback from the screen translate into linearity, i.e. ideal linearity equates to no changes in frequency. Therefore, the size error relates to absolute frequency difference as compared to known references.

In accordance with the invention, the error is determined from the index pulse feedback, which is an output of a main phase lock loop (PLL) voltage controlled oscillator (VCO), which tracks the index pulse. The output of the voltage controlled oscillator, in digital form, is used to determine the error relative to the known crystal oscillator reference. A frequency to voltage converter is used to convert the index pulse and the frequency difference to a voltage level which is then digitized and processed by a digital signal processor (DSP) which provides inter alia general control, signal processing on the error (i.e. interpolation, extrapolation, filtering, etc.) as well as a built in test function. A digital memory serves as a storage element for incoming error data as well as an output buffer for post-processed data. The digital error data in memory is converted back to analog levels before being summed into a main horizontal amplifier for size control, and an auxiliary horizontal amplifier for linearity control. Size information is taken from the signal as a single digital point per raster line. Linearity error is taken from the same signal to comprise approximately 256 data points per raster line.

BRIEF DESCRIPTION OF THE DRAWING

In the drawing, to which reference will be made in the specification.

DETAILED DESCRIPTION OF THE DISCLOSED EMBODIMENT

Figure 1:
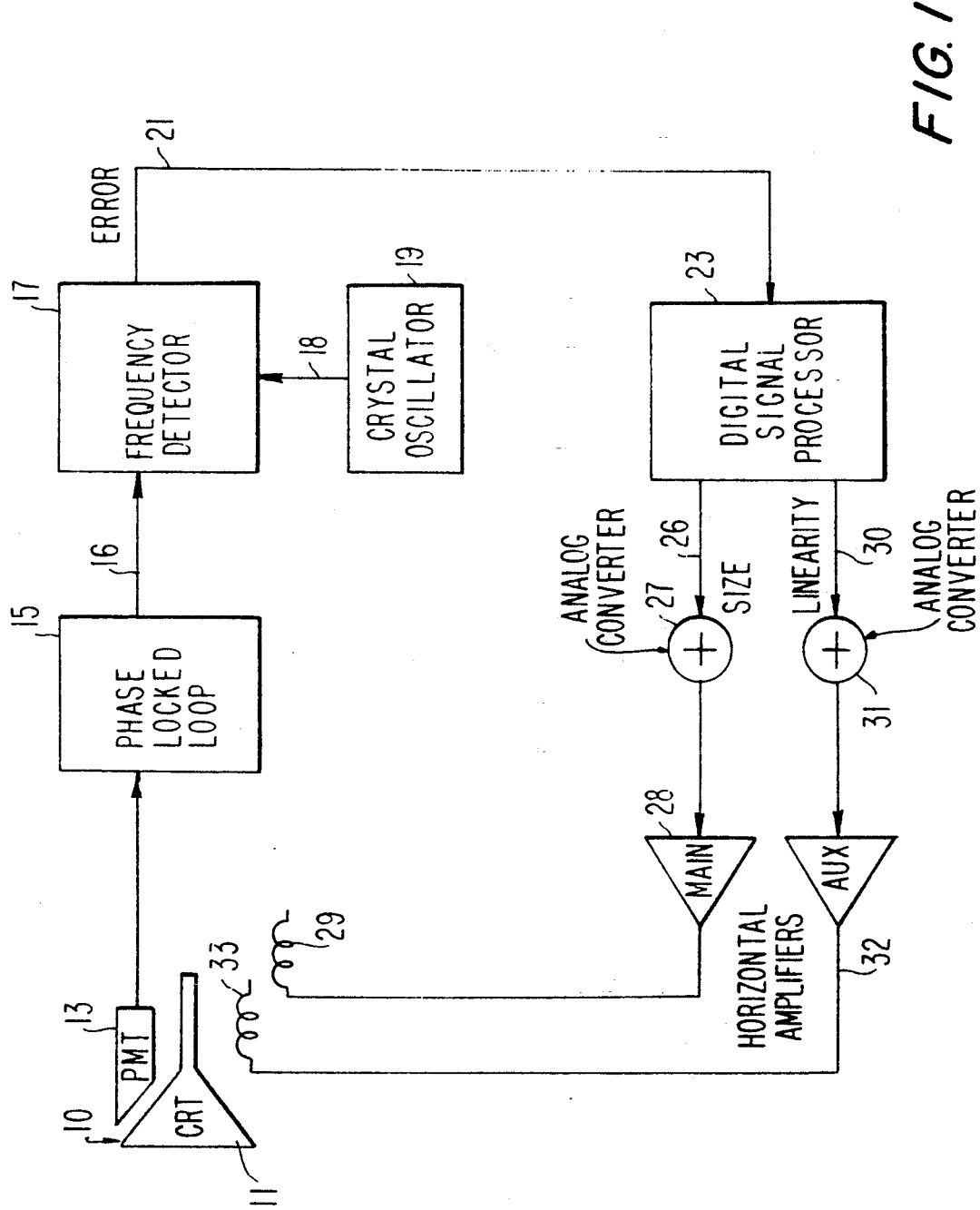
FIG. 1 is a schematic block diagram of an embodiment of the invention.

In accordance with the invention, the device, generally indicated by reference character 10 includes a cathode ray tube display 11 of known type used for continuously displaying data in so-called "rolling window" fashion. Index like pulses from the tube are sent by a photo monitoring timer 13, and a signal is forwarded to a phase locked loop voltage controlled oscillator 15 having an output signal 16 received by frequency detector 17. The detector 17 serves a comparator function and receives a reference signal 18 from a crystal oscillator 19.

The resulting output error signal 21 is fed to a digital signal processor 23 including integral memory. The processor provides a first output signal 26 fed to an analog convertor 27 and thence to a main horizontal amplifier 28 and to a horizontal main coil 29. A second output signal 30 is also fed to an analog convertor 31 and thence to a horizontal auxiliary amplifier 32 and a horizontal auxiliary coil 33.

Due to the fact that the linearity corrector is . attempting to control beam speed, 256 sample points of beam position are taken for each horizontal line to give the processor an accurate map of the beam speed variations across the line. Horizontal beam speed is greater than vertical beam speed, so more sample points are required to capture variations in the X-direction (horizontal) than in the Y-direction (vertical). For this reason, the size adjustment applied to the main horizontal amplifier requires only a single sample point per line. This point was selected to be in the center of each line.

The processor acquires multiple frames of data consisting of 256 sample points for each line in the frame. For a given point, the multiple frame data is produced closely approximating the actual linearity error map of the entire screen. The processor uses the 256 points per line to smooth the curve for linearity. It examines the slope of the function on the left and right boundaries (edges of the screen) and from that data interpolates values for correction back to the left edge of the screen where linearity error is greatest.

The resulting curve is output to a set of digital-to-analog converters. The analog correction voltage applied to the horizontal coils (main coil for size, auxiliary coil for linearity) results in speed compensation for the beam which is sweeping the screen.

We wish it to be understood that we do not consider the invention to be limited to the precise details of structure shown and described in the specification, for obvious modifications will occur to those skilled in the art to which the invention pertains.

We claim:

1. An improved system for providing continuous linearity correction in a beam index display comprising: a reference frequency source; a phase lock loop voltage controlled oscillator controlled by the raster index pulses of said display; means for comparing the frequency of said reference frequency source and said voltage controlled oscillator in terms of an error frequency level; a digital signal processor receiving said error frequency level; a digital memory storage element receiving the output of said signal processor in terms of linearity correction; a main horizontal amplifier circuit including a digital to analog converter receiving stored signals in terms of a single digital point per raster line; an auxiliary horizontal amplifier circuit receiving the same signal in terms of plural data points per raster line; and means for timing the entry of said signals to match the phase delays of said beam index display.

2. An improved system in accordance with claim 1, further comprising a separate raster deflection coil receiving the output signals of each of said main and auxiliary horizontal amplifier circuits.

* * * * *